United States Patent [19]

Shindo et al.

[11] Patent Number: 5,065,180
[45] Date of Patent: Nov. 12, 1991

[54] IMAGE RECORDING APPARATUS HAVING MEANS FOR PREVENTING SHEET CARTRIDGE FROM ITS FREE DISASSEMBLY

[75] Inventors: Tatsuya Shindo, Nagoya; Hideo Yoshihara, Kasugai, both of Japan

[73] Assignee: Brother Kogyo Kabushiki Kaisha, Aichi, Japan

[21] Appl. No.: 611,072

[22] Filed: Nov. 9, 1990

[30] Foreign Application Priority Data

| Nov. 30, 1989 | [JP] | Japan | 1-311494 |
| Apr. 3, 1990 | [JP] | Japan | 2-88471 |
| Apr. 3, 1990 | [JP] | Japan | 2-88473 |
| Apr. 3, 1990 | [JP] | Japan | 2-88474 |
| Apr. 3, 1990 | [JP] | Japan | 2-88475 |

[51] Int. Cl.$^5$ ............................................. G03B 27/58
[52] U.S. Cl. ................................... 355/72; 352/78 R; 352/170
[58] Field of Search ................. 355/72; 352/78 R, 170

[56] References Cited

U.S. PATENT DOCUMENTS

| 3,454,333 | 7/1969 | Wells | 352/78 R |
| 4,864,362 | 9/1989 | Hayashi et al. | 355/72 |
| 4,928,897 | 5/1990 | Satou et al. | 355/72 |
| 4,947,472 | 8/1990 | Maeda | 355/72 |

Primary Examiner—Monroe H. Hayes
Attorney, Agent, or Firm—Oliff & Berridge

[57] ABSTRACT

An image recording apparatus having a sheet cartridge which stores therein an elongated photosensitive recording medium. A locking mechanism is provided selectively engageable with the sheet cartridge or a light shielding member which is positioned to prevent the cartridge from being exposed to light. A control means is provided to provide locking state of sheet cartridge or the light shielding member by controlling the locking mechanism to its locking position. This control is made in response to a signal indicative of the installation of the sheet cartridge at its predetermined position. The control means is also adapted to provide unlocking state of the sheet cartridge or the light shielding member by controlling the locking mechanism to its unlocking position. This control is made in response to a signal indicative of the complete discharge of the elongated photosensitive recording medium out of the sheet cartridge. The locking state is also provided in response to the signal indicative of the installation of the sheet cartridge plus a signal indicative of a complete closure of the light shielding member. The locking state is also provided upon complete sheet loading along a sheet path in the image recording apparatus.

33 Claims, 10 Drawing Sheets

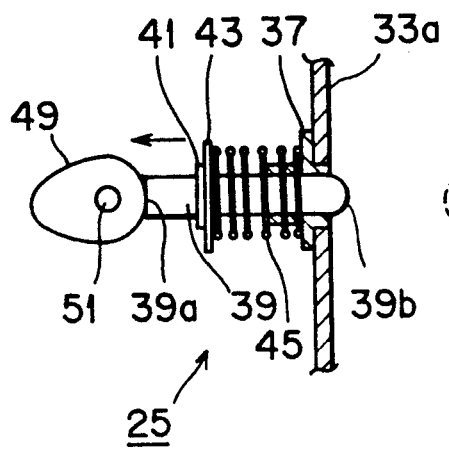
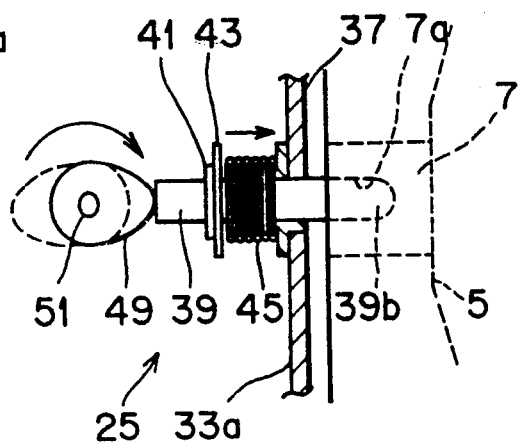
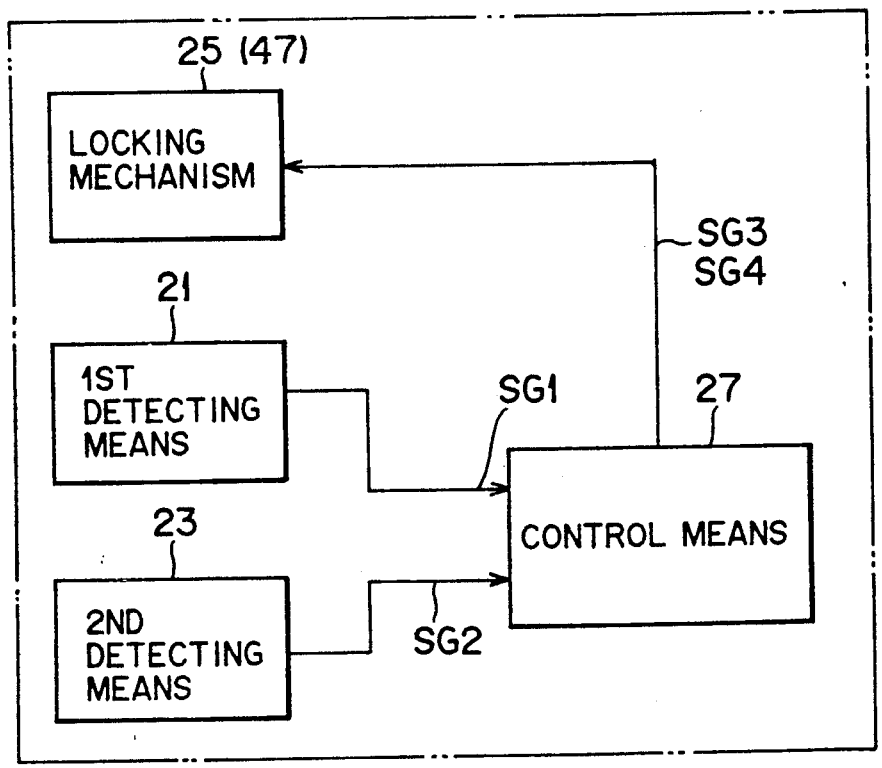

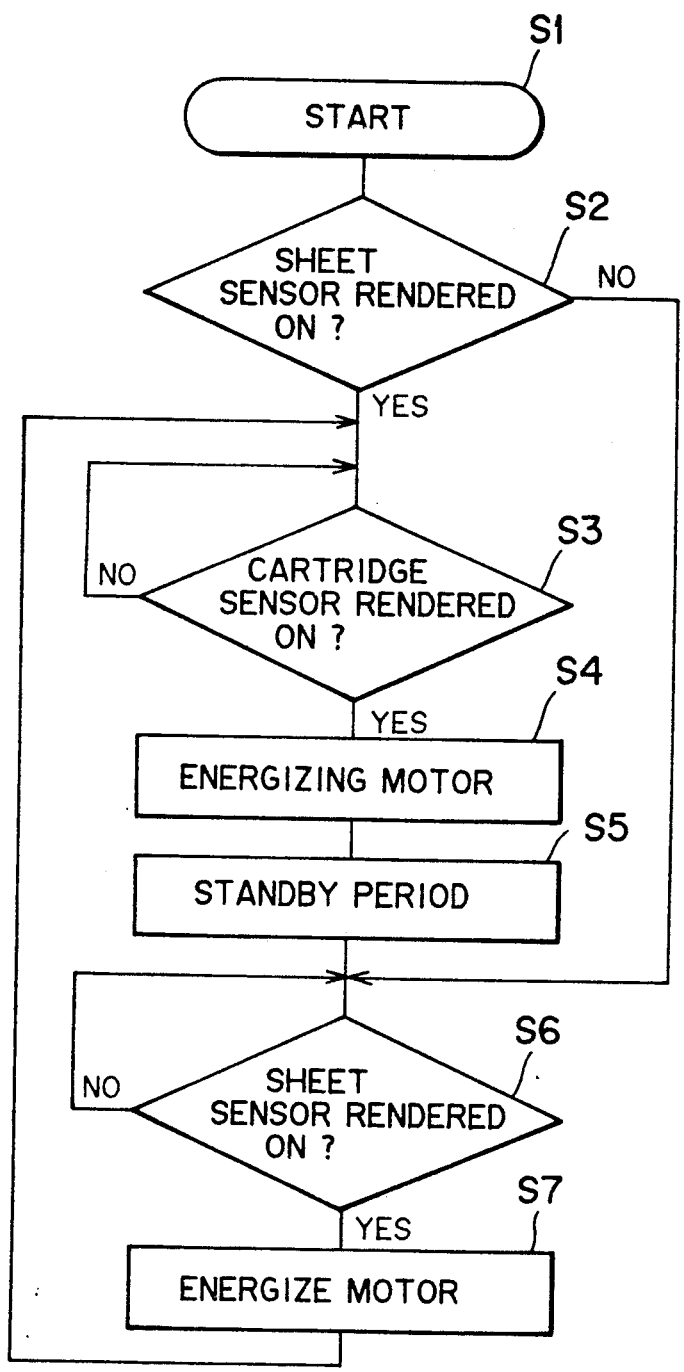

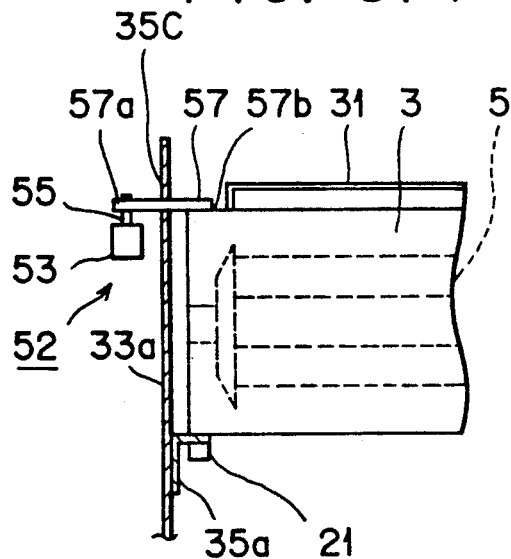
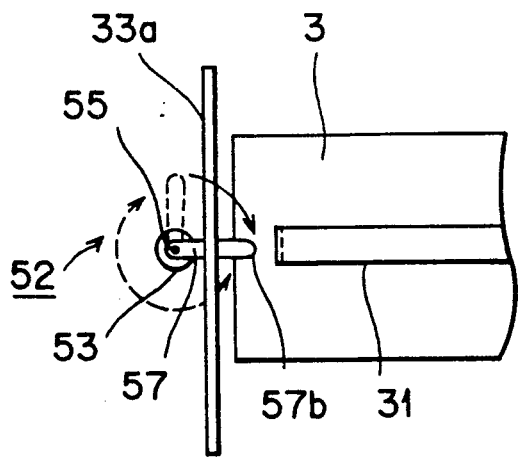
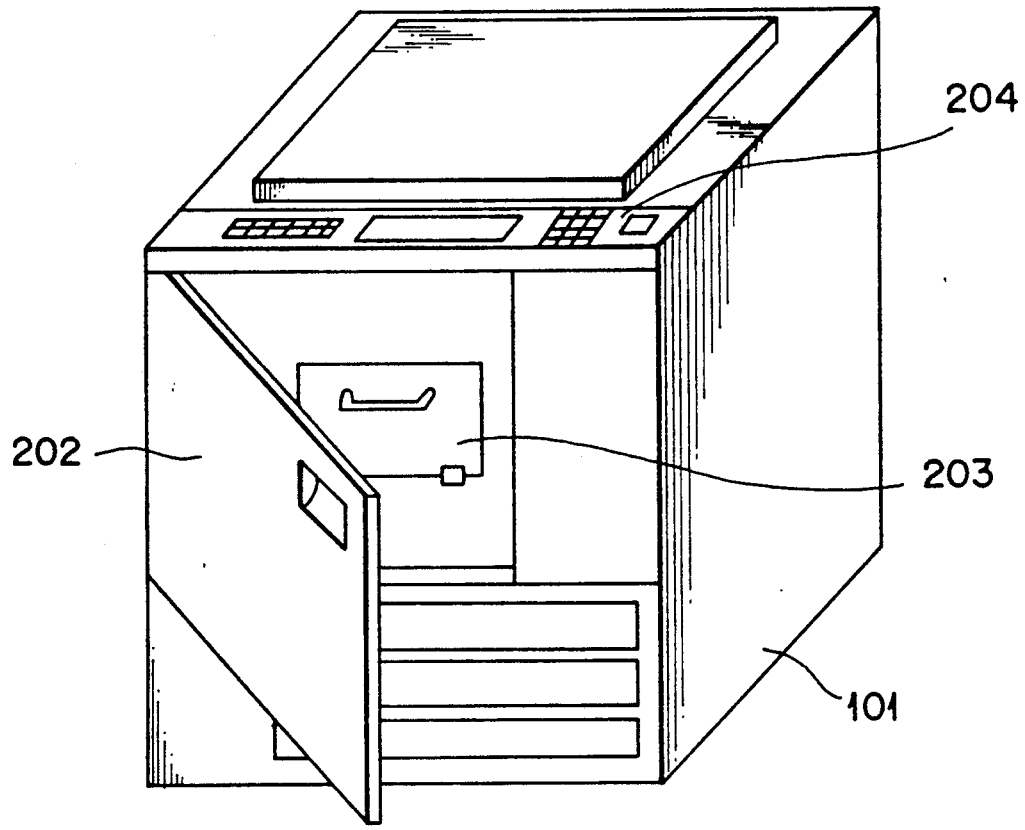

IMAGE RECORDING APPARATUS HAVING MEANS FOR PREVENTING SHEET CARTRIDGE FROM ITS FREE DISASSEMBLY

BACKGROUND OF THE INVENTION

The present invention relates to an image recording apparatus which employs an elongated photosensitive image recording medium. More particularly, the invention relates to such image recording apparatus having means for preventing a sheet cartridge from its free disassembly from a machine frame, and means for controlling disassembly timing of a sheet cartridge which stores therein the elongated photosensitive medium.

In one conventional image recording apparatus which uses a rolled and elongated photosensitive pressure sensitive recording medium, a latent image corresponding to an image of an original is formed on the photosensitive pressure sensitive recording medium at an exposure portion, and the light-exposed medium is superposed with a developer medium or sheet and are pressed together to provide a visible image on the developer sheet. Such apparatus is disclosed in, for example, U. S. Pat. No. 4,893,147.

In the conventional apparatus, a sheet cartridge which stores therein the rolled photosensitive pressure sensitive recording medium is assembled into a frame of the apparatus, and the recording medium is installed in its sheet path and is directed toward a takeup means for winding the lightexposed photosensitive pressure sensitive recording medium thereover.

However, according to the conventional device, after installation of the photosensitive pressure sensitive recording medium at its sheet path, the sheet cartridge can be detached from the frame. Therefore, the sheet cartridge may be erroneously disassembled from the frame by an operator even if wholly unexposed photosensitive pressure sensitive recording medium still remains in the sheet cartridge. Accordingly, unexposed portion of the photosensitive pressure sensitive recording medium is disadvantageously drawn out of the sheet cartridge. Therefore, when assembling the sheet cartridge into its proper location, the takeup means must be manually rotated, which requires skills for the operator.

In another conventional image recording apparatus, a front door is provided for sheet jamming treatment. In the apparatus, a light shielding plate is provided at the cartridge installing portion in order to prevent the photosensitive pressure sensitive recording sheet drawn from the cartridge from being exposed to light due to the door opening. The front door can be opened at any time, and the light shielding plate is also freely openable by an operator. Therefore, if the operator inadvertently opens the front door and the light shielding plate irrespective of the recovery of the sheet jamming, the unexposed recording medium may undergo light exposure. Consequently, such light exposed portion becomes unavailable for the image recording operation. Further, the operator may freely open the door and the light shielding plate for sheet checking, and another sheet jamming may occur due to improper disassembly of the sheet cartridge from the frame. Incidentally, a related application, commonly assigned has been filed bearing a Ser. No. 07/470,900 filed on Jan. 29, 1990.

SUMMARY OF THE INVENTION

In view of the above-described drawbacks, the present invention has been made to provide an improved image recording apparatus which prevents a sheet cartridge from free disassembly or take-out from a frame of the apparatus if a photosensitive recording medium is loaded along its sheet path within the frame.

Another object of the invention is to prevent a light shielding plate from being freely opened when the photosensitive recording medium is still loaded along its sheet path, to thereby avoid inadvertent light exposure to the medium and sheet jamming.

These and other objects of the present invention will be attained by providing an image recording apparatus which uses an elongated photosensitive recording medium, the apparatus including a frame and a sheet cartridge detachably provided at a predetermined position of the frame, the sheet cartridge storing therein the elongated photosensitive recording medium, and the improvement comprising locking means for preventing the sheet cartridge from being disassembled from the predetermined position, means for generating a first signal indicative of providing the locking means at its locking position, means for generating a second signal indicative of providing the locking means at its unlocking position, and control means connected to the locking means for driving the locking means to one of its locking and unlocking positions in response to one of the first and second signals.

In one embodiment, the means for generating the first signal comprises a first detecting means for detecting assembly of the sheet cartridge onto the predetermined position of the frame, the first detecting means generating the first signal indicative of the assembly of the sheet cartridge. Further, the means for generating the second signal comprises a second detecting means for detecting existence of the photosensitive recording medium within the sheet cartridge, the second detecting means generating the second signal indicative of a complete discharge of the photosensitive recording medium from the sheet cartridge.

In another embodiment, the image recording apparatus includes a key board for various operation of the image recording apparatus. The means for generating the second signal comprises the key board on which a figure code is manipulated.

In another aspect of the invention, there is provided an image recording apparatus which uses an elongated photosensitive recording medium, the apparatus including a frame and a sheet cartridge detachably provided at a predetermined position of the frame, the sheet cartridge storing therein the elongated photosensitive recording medium, and the improvement comprising; the frame being provided with a sheet cartridge installing portion defining an open end, a light shielding means for selectively closing the open end in order to avoid inadvertent light irradiation onto the photosensitive recording medium, locking means for locking the light shielding means at its close position, detecting means for detecting the photosensitive recording medium within the sheet cartridge, the detecting means generating a signal indicative of a complete discharge of the photosensitive recording medium out of the sheet cartridge, and control means connected to the locking means for releasing the locking state of the light shielding means in response to the signal.

In still another aspect of the invention, there is provided an image recording apparatus which uses an elongated photosensitive recording medium, the apparatus including a frame, a takeup means, and a sheet cartridge detachably provided at a predetermined position of the frame, the sheet cartridge having a cartridge shaft and storing therein the elongated photosensitive recording medium, the medium being pulled out of the sheet cartridge and taken up by the takeup means through a sheet path; and the improvement comprising; first detecting means for detecting assembly of the sheet cartridge onto the predetermined position of the frame, the first detecting means generating a first signal indicative of the assembly of the sheet cartridge, second detecting means for detecting existence of the photosensitive recording medium within the sheet cartridge, the second detecting means generating a second signal indicative of a complete discharge of the photosensitive recording medium from the sheet cartridge, means for preventing the sheet cartridge from being disassembled from the predetermined position, and control means for executing the prevention of the disassembly in response to at least the first signal and for disassembling the sheet cartridge in response to the second signal.

In still another aspect of the invention, there is provided an image recording apparatus which uses an elongated photosensitive recording medium, the apparatus including a frame and a sheet cartridge detachably provided at a predetermined position of the frame and a takeup means, the sheet cartridge storing therein the elongated photosensitive recording medium, the medium being fed along its sheet path between the sheet cartridge and the takeup means, and the improvement comprising; an automatic sheet loading means for loading a given length of a leading end portion the elongated photosensitive recording medium at its sheet path, locking means for preventing the sheet cartridge from being disassembled from the predetermined position, means for detecting completion of the automatic sheet loading and for generating a signal indicative of the completion of the sheet loading, control means for driving the locking means to its locking position in response to the sheet loading completion signal.

BRIEF DESCRIPTION OF THE DRAWINGS

In the drawings;

FIGS. 3(a) and 3(b) show cross-sectional views of a cartridge lock mechanism in its cartridge unlock and lock states, respectively according to one embodiment of this invention;

FIG. 4 shows a block diagram showing a fundamental electrical arrangement for controlling locking and unlocking to the sheet cartridge according to one embodiment of this invention;

FIG. 5 is a flowchart for description of a control routine for controlling selective locking to the sheet cartridge according to one embodiment of this invention;

FIG. 6(a) is a cross-sectional view showing a cartridge locking mechanism according to a modified embodiment of this invention;

FIG. 6(b) is a plan view of the cartridge locking mechanism according to the modified embodiment;

FIG. 7 is a perspective view showing another example of an image recording apparatus to which the present invention is applied;

DETAILED DESCRIPTION OF THE PREFERRED EMBODIMENTS

An image recording apparatus according to one embodiment of this invention will be described with reference to accompanying drawings.

Figure 1:
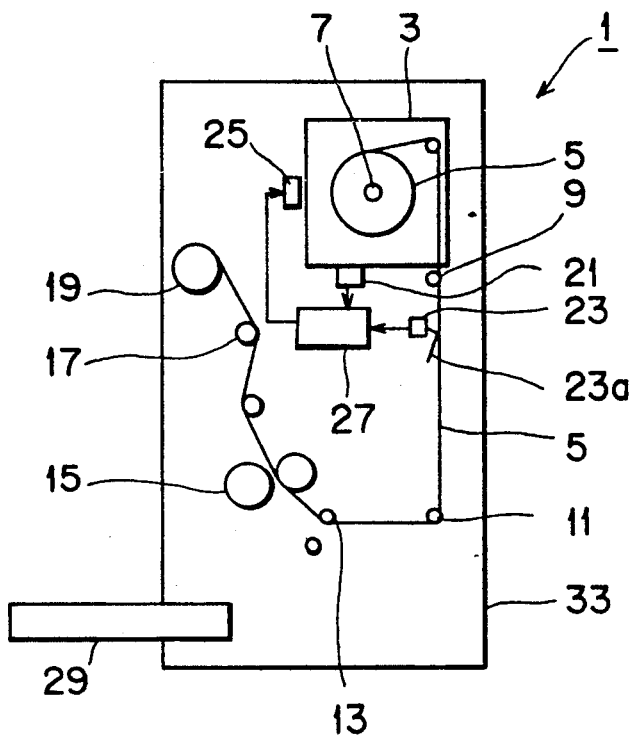
FIG. 1 is a schematic illustration showing one example of an image apparatus to which the present invention is applied.

FIG. 1 shows an overall structure of an image recording apparatus 1 which generally employs an elongated photosenstitive pressure sensitive image recording sheet or a microcapsule sheet 5 and a cut developer sheet or an output image recording sheet (not shown). The microcapsule sheet 5 has a substrate whose surface is coated with microcapsules encapsulating therein chromogenic materials reactable with a developer material coated over a substrate of the developer sheet. By this reaction, an output color image is provided on the developer sheet. Details of these image recording mediums are disclosed in a U.S. Pat. 4,399,209, and therefore, further description can be neglected.

In the apparatus shown in FIG. 1, a sheet cartridge 3 is provided for storing therein the photosensitive pressure sensitive recording medium 5 wound over a cartridge shaft 7. The sheet cartridge 3 is detachable from a machine frame 33 in a vertical direction. A leading end of the photosensitive pressure sensitive recording medium 5 is pulled out of the cartridge 3 and is directed downwardly through a pullout roller 9, and reaches to a takeup roller 19 through a tension roller 11, a drive roller 13, a pressure developing unit 15 and a meandering travel control roller 17 in a known manner. Incidentally, a sheet cassette 29 is provided for feeding each one of the developer sheet toward the pressure developing unit 15.

At a position immediately below the installed cartridge 3, a cartridge sensor 21 functioning as a first detection means is provided. Further, a recording medium sensor or a sheet sensor 23 functioning as a second detection means is provided at a position between the pull-out roller 9 and the tension roller 11 and along the sheet path. The cartridge sensor 21 is adapted for detecting the cartridge 3, that is detecting the assembling state of the cartridge 3. For this, the cartridge sensor includes a microswitch (not:shown) operable in response to a weight of the cartridge when mounted. The sheet sensor 23 is adapted for detecting the traveling state of the photosensitive pressure sensitive recording medium 5 positioned between the pull-out roller 5 and the tension roller 11. That is, the sensor 23 detects a tension of photosensitive pressure sensitive recording medium 5. The sheet sensor 23 includes a microswitch which is rendered ON/OFF by an actuator 23a. More specifically, when the photosensitive pressure sensitive recording medium 5 is fed under a given tension, the actuator 23a is displaced by the tension for actuating the microswitch. In response to the actuation of the microswitch, an output signal from the sheet sensor 23 is generated, for example, OFF signal is issued.

A cartridge locking mechanism 25 is provided at a position adjacent the cartridge 3. As described later, the cartridge locking mechanism 25, the cartridge sensor 21 and the sheet sensor 23 are connected to an electronic control circuit or control means 27 which is a computer including a CPU.

Figure 2:
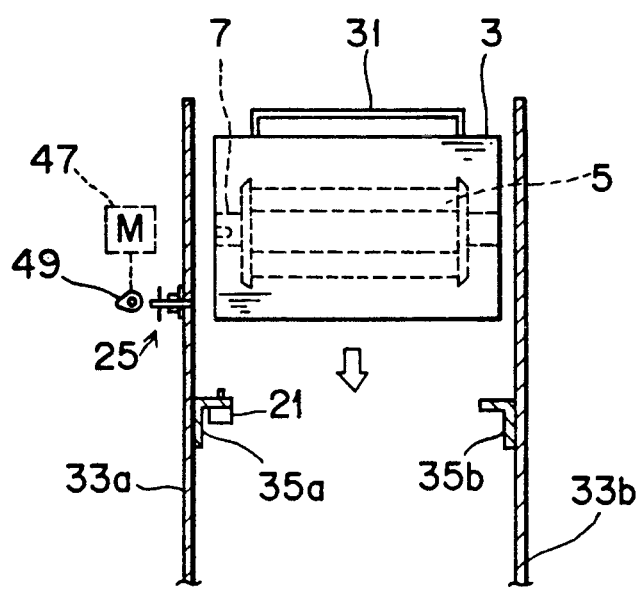
FIG. 2 is a cross-sectional elevation showing a sheet cartridge and ambient components of the image recording apparatus according to one embodiment of this invention.

FIG. 2 shows the sheet cartridge 3 and its installing portion of the image recording apparatus. The sheet cartridge 3 has a hand gripper 31 to manually lift the cartridge for its assembly and disassembly relative to the cartridge installing portion. A pair of chassis 33a and 33b define the machine frame 33 and a pair of cartridge seats 35a and 35b are fixedly secured to the chassis 33a and 33b for mounting the sheet cartridge 31 on the seats 35a and 35b. The above described cartridge sensor 21 is attached to one of the cartridge seats 35a. If an operator grips the hand gripper 31 and inserts the cartridge 3 downwardly onto the cartridge seats 35a and 35b, the cartridge 3 is positioned at a given position. Further, upon seating of the cartridge 3 on the seats 35a, 35b, the cartridge sensor 21 becomes actuatable.

One of the chassis 33a is provided with the above described cartridge locking mechanism 25 specifically shown in FIGS. 3(a) and 3(b). The chassis 35a is formed with a hole through which a bushing 37 is fitted. Further, a cartridge locking rod 39 is disposed slidable with respect to the bushing 37. The rod 39 is axially movable into the interior space defined by the pair of chassis so as to engage a hollow space 7a of the cartridge shaft 7 as shown in FIG. 3(b). The locking rod 39 is integrally provided with a stop ring 41 with which a stop seat ring 43 is abuttable. A coil spring 45 is disposed over the locking rod 39 and is interposed between the seat ring 43 and the bushing 37 so as to normally urge the locking rod 39 toward a cam 49 (in a direction indicated by an arrow shown in FIG. 3(a)).

The cam 49 is integrally mounted on a drive shaft 51 driven by a motor 47 (FIG. 2). The rod 39 has one end 39a in contact with a surface of the cam 49 and has another end 39b extendible into the internal space. If the cam 49 has one angular rotational position shown in FIG. 3(a), the locking rod 39 is biasedly moved toward the cam 49, so that the locking rod 39 is disengageable from the cartridge shaft 7 or the cartridge 12 can be mounted on the seats 35a, 35b. In this case, the other end 39b of the rod 39 is slightly projected into the internal space defined by the chassis 33a and 33b. On the other hand, if the cam 49 has another angular rotational position (rotated by 180 degrees from the position shown in FIG. 3(a)), the cam 49 urges the locking rod 39 toward the hollow space 7a of the cartridge shaft 7 against the biasing force of the coil spring 45 in a direction indicated by an arrow in FIG. 3(b). In this case, the other end 39b of the rod 39 largely projects into the internal space. Consequently, the cartridge 3 is securely locked at the given position.

A fundamental electrical arrangement is shown in FIG. 4. As described above, the first detecting means (cartridge sensor)21, the second detecting means (sheet sensor 23) and the cartridge locking mechanism 25 (the motor 47) are connected to the controller 27. The first detecting means 21 generates a cartridge mount signal SG1 upon installation of the cartridge 3 onto the seats 35a,35b, and the cartridge mount signal SG1 is transmitted to the control means 27. The second detection means 23 generates a signal SG2 indicative of non existence of the photosensitive pressure sensitive recording medium 5, and the signal SG2 is transmitted to the control means 27. In response to these signals, the control means 27 generates signal SG3 or SG4 to the motor 47 of the cartridge locking mechanism 25, the signals SG3 and SG4 being indicative of cartridge locking and unlocking relative to the chassis 33a, 33b.

Next, a control routine in accordance with the first embodiment of this invention will be described with reference to a flowchart shown in FIG. 5. Apparently, the chart is governed under programmed processing in the CPU installed in the control means 27.

First, if a power switch (not shown) of the apparatus 1 is rendered ON, a control program is started in Step S1. Then determination is made as to whether the sheet sensor 23 is rendered ON in Step S2. If rendered YES, the routine proceeds into Step S3 where determined is whether or not the cartridge sensor 21 is rendered ON. If rendered YES in Step S3 (the cartridge 3 has been mounted on the seats 35a, 35b), the motor 47 of the cartridge locking mechanism 25 is energized so as to provide a lock position(FIG. 3(b)) of the cam 49 in Step S4. As a result, the locking rod 39 is brought into engagement with the hollow space 7a of the cartridge shaft 7 for locking the cartridge 3 at a mount position on the seats 35a, 35b. In Step S3, if the cartridge sensor 23 is not rendered ON, i.e, the determination falls NO(the cartridge has not yet been installed on the seats), the routine S3 is repeatedly executed until the cartridge 3 is mounted on the seats 35a, 35b.

After the cartridge 3 is locked at its given position in Step S4, a predetermined time interval is provided in Step S5. In this predetermined period, the photosensitive pressure sensitive recording medium 5 is installed at its sheet path. Then, in Step S6, determination is made as to whether or not the sheet sensor 23 is rendered ON. Until the sheet sensor 23 is rendered ON, the locking state of the sheet cartridge 3 is maintained.

By the continuous copying operation, the photosensitive pressure sensitive recording medium 5 in the sheet cartridge 3 is used out, and a tail edge of the photosensitive pressure sensitive recording medium 5 may be released from the cartridge. If the tail edge of photosensitive pressure sensitive recording medium 5 passes through the pull-out roller 9, the sheet tension bridging between the roller 9 and the tension roller 11 is immediately reduced. Accordingly, the actuator 23a which has been deformed by the given tension of the photosensitive pressure sensitive recording medium 5 restores its original shape. Consequently, the sheet sensor 23 is rendered ON. Therefore, the determination in Step S6 falls YES, so that the routine proceeds into Step S7 where the motor 47 is again actuated to provide cartridge releasable position of the locking rod 39 (FIG. 3(a)).

Incidentally, after Step S1, if the determination in Step S2 falls NO, the result implies the ordinary loading of the photosensitive pressure sensitive recording medium 5 at its sheet path under given tension. In this case, the routine proceeds into Step S6 where the determination is repeatedly carried out until the sheet sensor 23 is rendered ON.

Thereafter, the takeup roller 19 is replaced with a new takeup roller 19, and the unlocked sheet cartridge 3 is disassembled from the chassis 33a, 33b by manually lifting the gripper portion 31. Then, a new cartridge 3 is installed, and a routine returns back to Step S3 for repeatedly executing subsequent steps S 4 through S7.

FIGS. 6(a) and 6(b) show a modified embodiment to a cartridge locking mechanism 52. In this modification, one of the chassis 33a is formed with a horizontally extending slit 35c through which a stop plate 57 is extendible. The stop plate 57 has a base end integrally coupled to a drive shaft 55 of a drive motor 53. As is apparent from FIG. 6(b). in accordance with the energization of the motor 53, the stop plate 57 is angularly moved in a horizontal plane by, for example, 90 degrees or 270 degrees and can be positioned immediately above the sheet cartridge 3 mounted on the seats 35a, 35b. Therefore, the upward movement of the cartridge 3 is restrained by the stop plate 57, to thereby avoid inadvertent removal of the cartridge 3.

In the foregoing embodiments, two locking mechanism 25 or 52 can be provided so as to position the locking rods 39 or stop plates 57 at both axial end portions of the cartridge 3.

Further, in the foregoing embodiments, the cartridge sensor 21 is positioned at the cartridge seat 35a, and the sheet sensor 23 is positioned between the pull-out roller 9 and the tension roller 11 and along the sheet path. However, such positions are not limited to these places, and various modifications are conceivable. For example, the cartridge sensor 21 can be positioned at a position space away above the cartridge seat 35a for detecting the assembling state of the cartridge3. Moreover, the sheet sensor 23 can be positioned within the sheet cartridge 3 or positioned between the tension roller 11 and the pressure developing unit 15 as far as the sensor 21 can detect existence of an unexposed area of the photosensitive pressure sensitive recording medium 5 or can detect the sheet residual condition within the cartridge 3.

Furthermore, the cartridge sensor 21 and the sheet sensor 23 are not limited to mechanical type switches such as the microswitch, but optical sensors or the like are also available. For example, the optical sensor can detect reflection light reflected at a metal layer such as an aluminum layer evaporated on a back surface of the photosensitive pressure sensitive recording medium 5.

Further, more, in the above described embodiments, the rolled photosensitive pressure sensitive recording medium 5 is used. However, an elongated and alternately folded image recording medium in zig-zag fashion is also available. The latter type of the medium is stored in a corresponding sheet cartridge and the cartridge is assembled to or disassembled from the frame 33.

As described above, in the first embodiment, when mounting the sheet cartridge 3 onto the cartridge seats 35a, 35b, the cartridge sensor 21 is automatically rendered ON so that the control means 27 generates the cartridge locking signal SG3 to the locking mechanism 25. Accordingly, the cartridge 3 is automatically locked with its assembled state and this locking state is maintainable until the photosensitive pressure sensitive recording medium 5 is completely drawn out of the cartridge 3. In other words, in the illustrated embodiment, the sheet cartridge 3 is continuously locked as far as the unexposed photosensitive sheet 5 remains in the sheet cartridge, Consequently, even if an operator erroneously attempts to remove the sheet cartridge in which photosensitive pressure sensitive recording medium 5 still remains, the locking mechanism 25 prevents the cartridge 3 from being disassembled. As a result, inadvertent sheet jamming or sheet exposure are avoidable.

Figure 8:
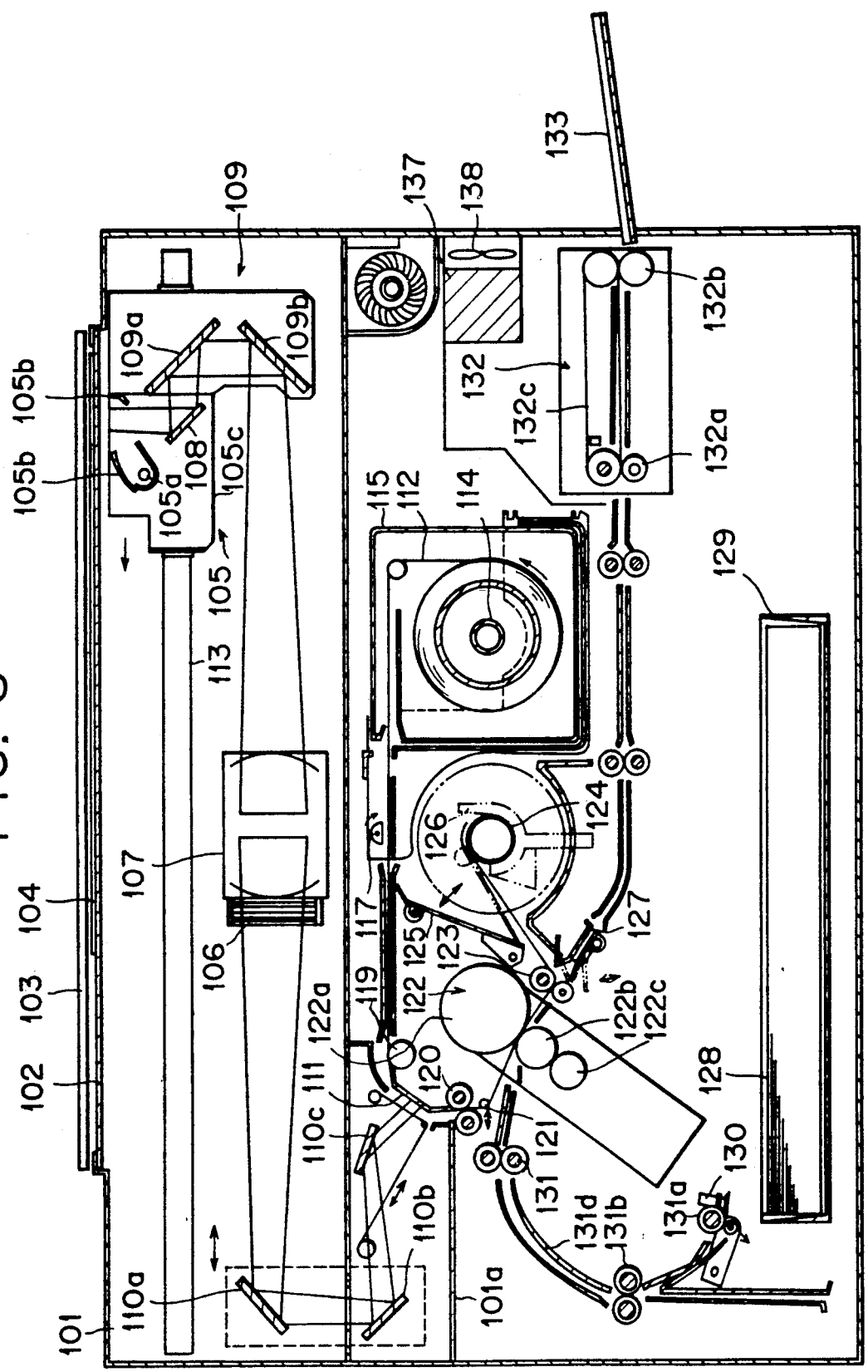
FIG. 8 is a cross-sectional view showing an internal arrangement of the other example of the image recording apparatus.

Next, another example of an image recording apparatus is shown in FIGS. 7 and 8. In the apparatus, a sheet cartridge 115 is releasable from a machine frame in a horizontal direction. That is, the sheet cartridge 115 is adapted to be pulled out of the machine frame by horizontally moving the cartridge 115.

According to this image recording apparatus 101 shown in FIG. 7, a front door 202 is hingedly supported to a machine frame for accessing an internal components of the machine frame in order to deal with, for example, sheet jamming. Further, a light shielding plate 203 is positioned inside the front door 202 for avoiding entry of light into a sheet cartridge 115 (FIGS. 8 and 9), the cartridge being assembled and disassembled by its horizontal displacement as described in connection with FIG. 9. Further, a key board 204 is provided on an external top portion of the machine frame so as to input various signals into the internal components of the apparatus. The signals may be a copy start signal and an automatic sheet loading signal for loading the photosensitive pressure sensitive sheet or microcapsule sheet 112 (FIG. 8) in its sheet path.

FIG. 8 shows an internal arrangement of the image recording apparatus 101 of FIG. 7. At a top portion of the image recording apparatus 101, a transparent original support glass 102 for mounting thereon an original 104 is provided, and a support glass cover 103 is pivotally disposed over the original support glass 102. Between the support glass 102 and the cover 103, the original 104 is positioned with its imaging surface facing downwardly.

An optical system is provided below the original support glass 102. The optical system includes a light source 105 including a halogen lamp 105a, reflectors 105b, and a reflection mirror 108, and a frame member 105c is provided for housing therein the light source 105. The frame member 105c is formed with a slit (not shown) for allowing light to pass therethrough toward the original support glass 102. A shaft 113 extends in parallel with the original support glass 102, and the frame member 105c is reciprocally movable along the shaft 113. The light source 105 provides a line light toward the original support glass 102 in a direction perpendicular to the moving direction of the frame member 105c. The light passing through the original support glass 102 is reflected at the original 104 and is directed downwardly.

The optical system also includes a first pair of reflection mirrors 109a, 109b supported by the frame member 105c but movable independent of the light source 105, another pair of reflection mirrors 110a, 110b, a projection lens 107, a filter unit 106 and a final reflection mirror 110c. The lens 107 and the filter unit 106 are positioned between the first and second pairs of the reflection mirrors 109a, 109b and 110a, 110b. The filter unit 106 is adapted for controlling color tone of a final output image. The light reflected from the original 104 is reflected at the reflection mirror 108 and the first pair of reflection mirrors 109a, 109b, so that the light is directed toward the second pair of the reflection mirrors 110a, 110b through the lens 107 and the filter 106 in a direction in parallel with the moving direction of the light source 105.

An exposure stand 111 is provided at a position adjacent the second pair of the reflection mirrors 110a, 110b for exposing the microcapsule sheet 112 to image carrying light. For this, the final reflection mirror 110c is provided between the reflection mirror 110b and the exposure stand 111 for directing the light reflected from the second pair of the reflection mirrors 110a, 110b toward the exposure stand 111. Accordingly, a latent image corresponding to the image of the original is formed on the microcapsule sheet 112 positioned on the exposure stand 111.

The second pair of the reflection mirrors 110a, 110b are normally stationarily positioned. However, these mirrors are movable together in the axial direction of the shaft 113 so as to control an optical path length in accordance with the change in copying magnification (m) such as size enlargement or reduction. Further, provided that a feeding velocity of the microcapsule sheet 112 is represented by "V", and the copying magnification is represented by "m", the moving speed of the halogen lamp 105a and the mirror 108 is set to V/m, and the moving speed of the first pair of reflection mirrors 109a and 109b is set to V/2m in order to obtain the latent image on the microcapsule sheet 112 positioned on the exposure stand 111 with the desired magnification m.

The elongated microcapsule sheet 112 is of a rolled form and a leading end portion of the sheet 112 is provided with a leader tape portion. Further, a sheet cartridge 115 is detachably positioned at a central inner portion of the machine frame. In the sheet cartridge 115, a rolled microcapsule sheet 112 is wound over a cartridge shaft 114. Within the sheet cartridge 115, a takeup shaft 124 is also disposed for winding the microcapsule sheet 112 thereover (see FIG. 13).

Further, feed rollers 119 is rotatably provided at a position below the exposure stand. Moreover, a dancer roller or a tension control roller 121 is provided for controlling a sheet slack of the microcapsule sheet, and a separation roller 123 is rotatably provided for separating the microcapsule sheet 112 from the developer sheet 128. A pressure developing unit 122 having a large diameter pressure roller 22a, a small diameter roller 122b and a back-up roller 22c is positioned between the dancer roller 121 and the separation roller 123 for pressure developing operation. A takeup shaft 124 is provided for taking up the light exposed microcapsule sheet 112. Thus, the microcapsule sheet path is defined by, in order, the tension roller 119, an upper surface of the exposure stand 111, the dancer roller 121, the pressure developing unit 122, the separation roller 123 and the takeup shaft 124. Incidentally, a partitioning wall 101a is provided so as to prevent the microcapsule sheet 112 positioned at upstream of the exposure stand 111 from being irradiated with light.

The feeding velocity of the microcapsule sheet 112 is controlled at constant speed, and the feeding movement is in synchronism with the movements of the mirrors 108, 109a and 109b. Accordingly, a latent image in line-by-line basis is successively provided on the microcapsule sheet 112 when it passes through the exposure stand 111.

At a position below the pressure developing unit 122, a sheet cassette 129 is installed in which a stack of the cut developer sheets 128 are stored. At a position above the cassette 129, a sheet feed mechanism 130 is provided which includes a suction means so as to deliver each one of the developer sheets 128 toward the pressure developing unit 122. Between the sheet feed mechanism 130 and the pressure developing unit 122, sheet feed rollers 131a, 131b, 131c and a sheet feed guide 131d are provided. The developer sheet 128 is thus delivered to an upstream side of the pressure developing unit 122.

Further, a thermal fixing unit 132 is provided at a position downstream of the pressure developing unit 122. The thermal fixing unit 132 includes a heat roller 132a, a discharge roller 132b and an endless belt 132c mounted on the rollers 132a and 132b. A discharge tray 133 is provided at a position downstream of the thermal fixing unit for receiving the developer sheet 128 in which a visible output image is formed. Furthermore, at a position above the thermal fixing unit 132, a deodorizing filter 137 is provided for trapping gaseous component released from the developer sheet during its heating. To enhance the gas trapping efficiency, a gas venting fan 138 is provided so as to forcibly introduce the gaseous component into the filter 137.

An automatic sheet loading function is given in the image recording apparatus 101 of this embodiment. By the automatic loading function, the leader tape portion of the rolled microcapsule sheet 112 can be automatically directed along the sheet path and is wound over the takeup shaft 124. Therefore, the subsequent microcapsule sheet 112 can be automatically installed at the sheet path and is successively wound over the takeup shaft 124. For this automatic loading, a sector roller 117 is provided at a position between the roller 119 and the sheet cartridge 115. Further, a separation chute 127 is pivotably provided at a position downstream of the separation roller 123 so as to direct the leader portion toward the takeup shaft 124. Furthermore, an upper guide 125 and a lower guide 126 are pivotably provided immediately above and below the takeup shaft 124, respectively for guiding the winding of the leader portion over the takeup shaft 124. For loading the microcapsule sheet at the sheet path, the upper guide 125, the lower guide 126 and the separation chute 127 are moved to positions indicated by a dotted chain lines in FIG. 8 for permitting the leader tape to be wound over the takeup shaft 124, On the other hand, when the loading operation is completed, these are moved to positions indicated by solid lines in FIG. 8, so that image recording operation is achievable.

With this structure, if a command is made for automatic sheet installation by the manipulation of the key board 204 (FIG. 7) after the sheet cartridge 115 is mounted on the machine frame, the automatic sheet loading operation will be initiated. The sector roller 117 is rotated about its axis by at least once so as to pull out the leader tape portion from the cartridge 115 to the feed rollers 120, 120. Then, the rotation of the sector roller 117 is stopped whereas the feed rollers 120, 120 are driven to further feed the leader tape portion toward the pressure developing unit 122. In this case, the separation chute 127, the upper guide 125 and the lower guide 126 are moved to positions indicated by one dotted chain lines in FIG. 8, so that the leader tape portion can be directed to the takeup shaft 124 and is wound thereover. Upon completion of the automatic sheet loading, the upper guide 125, the lower guide 126 and the separation chute 127 are moved to their solid line positions shown in FIG. 8 for performing the image recording operation.

If a copy start key (not shown) is manipulated, the reflection mirror 108 and the halogen lamp 105a are moved at a speed V/m, and the first pair of reflection mirrors 109a, 109b are moved at a speed V/2m assuming that the microcapsule sheet 112 is fed at a speed of V with aiming at image magnification of m. Since the feeding speed of the microcapsule sheet 112 is synchronized with the moving speeds of the mirrors 108, 109a, 109b, a line latent image is successively formed on the microcapsule sheet 112 when it passes over the exposure stand 111.

The microcapsule sheet 112 which carries the latent image is further transferred toward the pressure developing unit 122, and at the same time, the developer sheet 128 is fed thereto by the sheet feed mechanism 130 and the feed rollers 131a, 131b, 131c. The latent image surface of the microcapsule sheet 112 is superposed with the developer material surface of the developer sheet 128 at the pressure developing unit 122, and these are pressed together. Therefore, unexposed microcapsules are ruptured to provide a chromogenic reaction with the developer materials of the developer sheet 128, to thereby form a visible color image on the developer sheet 128.

The microcapsule sheet 112 passed through the pressure developing unit 122 is separated from the developer sheet 128 by the separation roller 123. Then, the developer sheet 128 is fed to the thermal fixing unit 132 where the coloring of the visible image is promoted by the heat roller 132a. The thus treated developer sheet 128 is discharged out of the thermal fixing unit by the discharge roller 132b and is fed onto the discharge tray 133.

Figure 9:
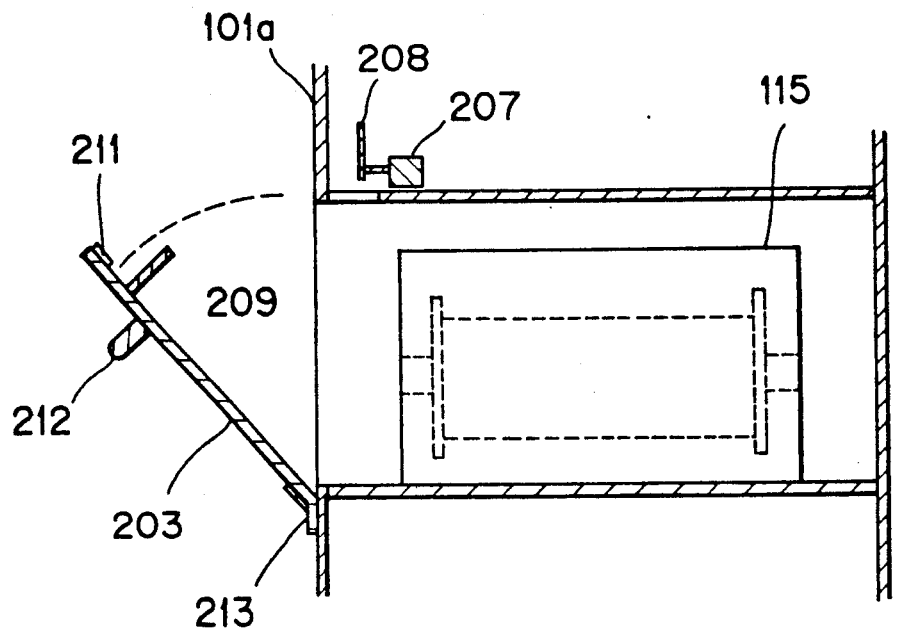
FIG. 9 is a cross-sectional view showing a sheet cartridge, a sheet cartridge mounting portion and a cartridge locking mechanism according to a second embodiment of this invention.
Figure 10:
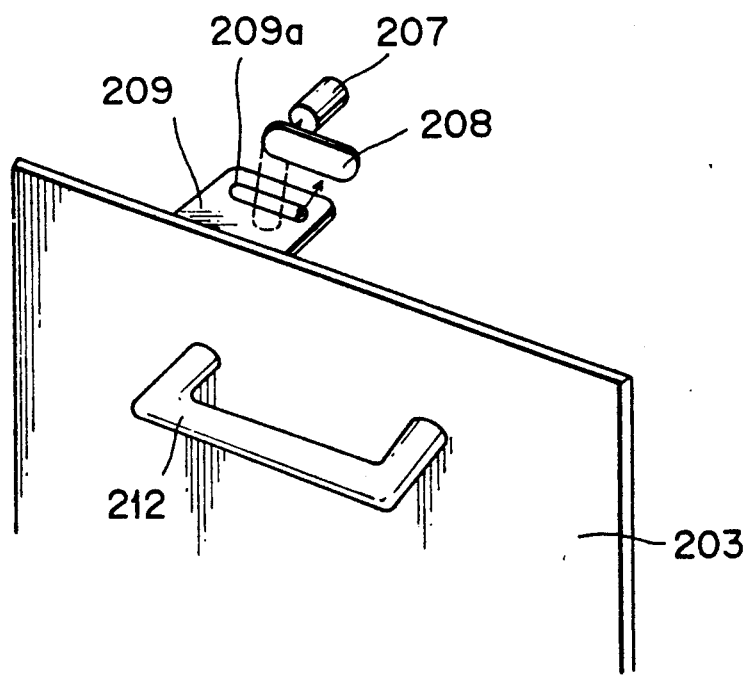
FIG. 10 is a partial perspective view showing a light shielding plate and the cartridge locking mechanism according to the second embodiment.

A sheet cartridge installing portion and a sheet cartridge locking mechanism according to a second embodiment of this invention will be described with reference to FIGS. 9 and 10. These arrangements serve as means for preventing the sheet cartridge from being freely disassembled from a machine frame or chassis of the image recording apparatus shown in FIGS. 7 and 8 (The cartridge installing portion and the locking mechanism is applied to the image recording apparatus 101 shown in FIGS. 7 and 8).

The light shielding plate 203 is provided pivotable to the chassis 101a of the machine frame by a hinge 213 for accessing the sheet cartridge 115. The light shielding plate 203 is provided with a grip 212 for facilitating opening of the plate 203. Further, an upper inner surface of the light shielding plate 203 is attached with a permanent magnetic member 211 attractable on a wall of the chassis 101a to thereby maintain closing state of the shielding plate 203. As best shown in FIG. 9, a locking plate 209 extends from an inner surface of the light shielding plate 203 toward the chassis 101a. The locking plate 209 is formed with a locking slot 209a. Furthermore, at an inner wall section of the chassis 101a, provided are lock driving motor 207 and a locking lever 208 coupled to a drive shaft of the motor 207. The locking lever 208 is selectively engageable with the locking slot 209a upon selective energization of the drive motor 207.

Figure 11:
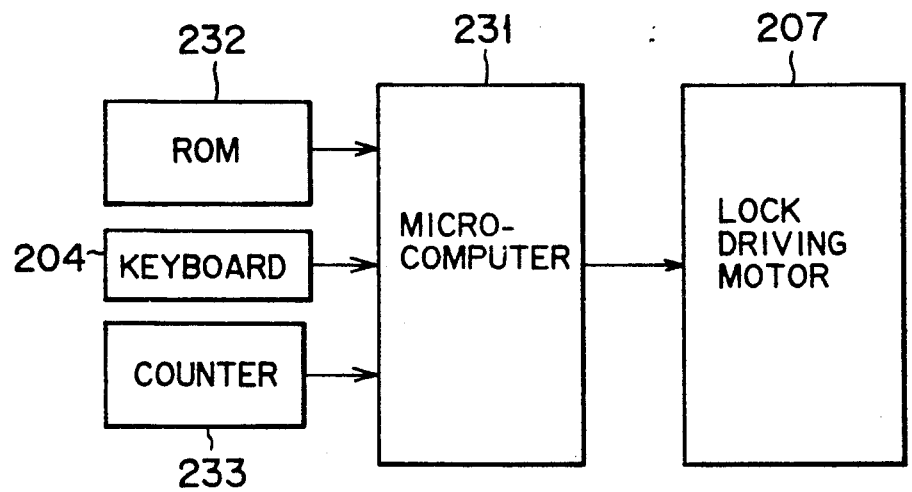
FIG. 11 is a block diagram showing an electrical arrangement for controlling locking and unlocking to the light shielding plate according to the second embodiment of this invention.

FIG. 11 is a block diagram showing an electrical arrangement for a control of locking and unlocking to the light shielding plate 203. The control arrangement includes a microcomputer 231, a ROM 232 and a counter 233. Further, the above described key board 204 is connected to the microcomputer 231, and the lock driving motor 207 is also connected to the microcomputer. The microcomputer 231 is connected to the ROM 232 which stores therein various operational programs and a time period during which the automatic sheet loading operation is completed. The microcomputer 231 is also connected to the counter 233 which counts actual automatic sheet loading period. The counting is started, for example, when the leader film portion attached to the leading end portion of the microcapsule sheet 112 is pulled out of the sheet cartridge 115. As described above, the key board 204 is provided to input the start signal for starting the automatic sheet loading.

Figure 12:
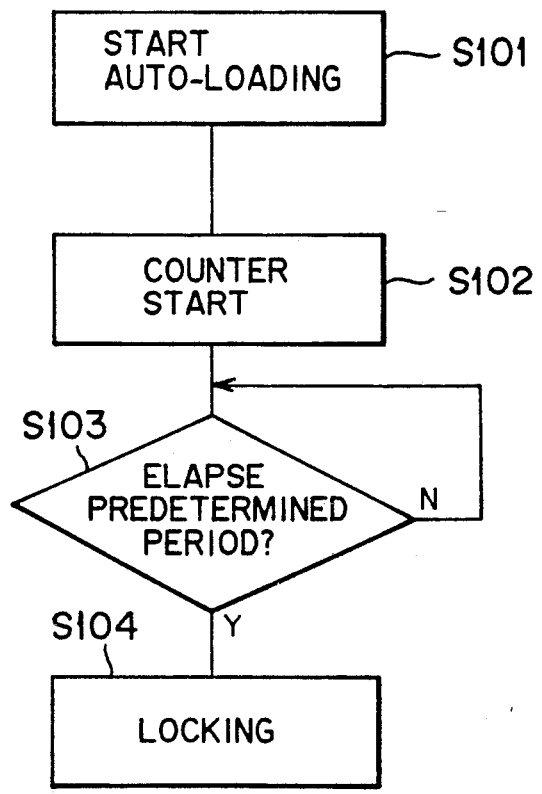
FIG. 12 is a flowchart for description of a control routine for controlling locking to the light shielding plate according to the second embodiment.

With such arrangement, a control routine is shown in FIG. 12 for controlling the lock driving motor 207 in order to control lock timing of the light shielding plate 203. According to the flowchart of FIG. 12, the sheet cartridge 115 is mounted on a predetermined location of the machine frame, and the light shielding plate 203 is closed. In this case, since the magnetic member 211 is provided, the close position of the plate 203 is maintainable. After closing the front door 202 (FIG. 7), the automatic sheet loading key of the key board 204 is manipulated. Thus, the leader tape or film portion is drawn out of the sheet cartridge 115 and is directed along the sheet path for starting the sheet loading operation in Step S101. In response to the start of the sheet loading, the counter 233 is actuated for starting the time counting operation in Step S102. Then, the leader tape portion reaches the takeup shaft 124 disposed in the sheet cartridge 115, and is wound over the takeup shaft 124. Then, in Step S103, a comparison is made between the stored predetermined period stored in the ROM 232 for completing the automatic sheet loading and the actual period counted by the counter 233. If the counted period reaches the predetermined period, the determination falls YES in Step S103, and then the routine proceeds into Step S104 for actuating the lock driving motor 207 to angularly move the locking lever 208 to engage the locking slot 209a of the locking plate 209. Therefore, the light shielding plate 203 is locked to obviate its pivotal opening movement.

As described above in the second embodiment, the light shielding plate 203 cannot be opened by the locking mechanism 207, 208, 209, 209a in accordance with the control of the lock control means shown in FIG. 11, if the automatic sheet loading operation is completed. Therefore, the loaded microcapsule sheet 112 is protected against inadvertent light exposure due to inadvertent opening of the light shielding plate, and the sheet jamming due to inadvertent disassembly of the sheet cartridge 115 is also avoidable.

Next, will be described means for preventing the sheet cartridge from being freely disassembled from the machine frame or chassis according to a third embodiment. The third embodiment is also particularly available to the image recording apparatus or copying machine shown in FIGS. 7 and 8. The third embodiment provides the sheet cartridge, the sheet cartridge mounting portion, and cartridge locking mechanism the same as those of the second embodiment. Further, as described with reference to FIG. 9, the sheet cartridge 115 accommodates therein the takeup shaft 124 as best shown in FIG. 13.

Figure 13:
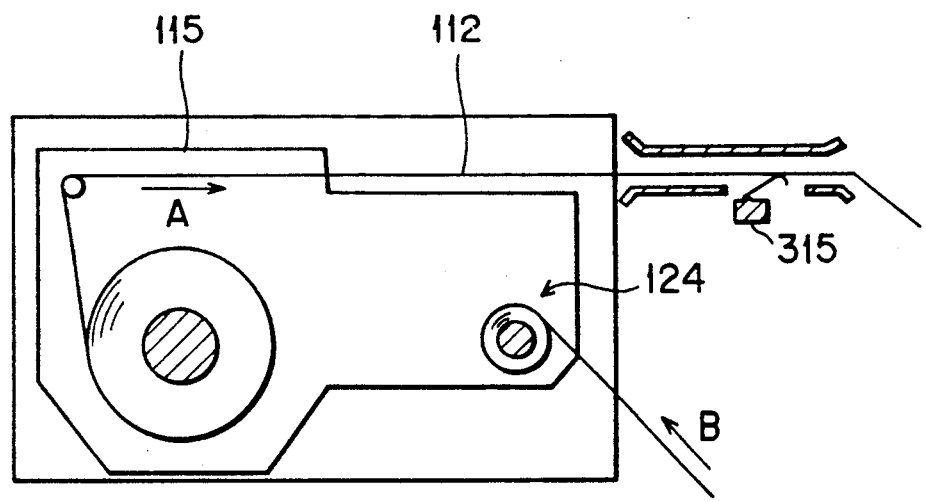
FIG. 13 is a schematic cross sectional view showing a sheet cartridge used in a third embodiment of this invention.

In FIG. 13, the unexposed microcapsule sheet 112 is rolledly positioned in the sheet cartridge 115 and the sheet 112 is pulled out of the cartridge 115 in a direction indicated by an arrow A. The takeup shaft 124 is also disposed in the cartridge 115 for winding light-exposed microcapsule sheet 112 in a direction indicated by an arrow B. In the third embodiment, an empty sensor 315 is also positioned at a sheet pull out section of the cartridge 115. The empty sensor 315 may correspond to the sheet sensor 23 in the first embodiment. The empty sensor 315 is adapted to generate a signal indicative of complete sheet discharge from a sheet supply side, for example, from the cartridge shaft. This sensor is of mechanical sensor which deforms upon application of the sheet tension. That is, similar to the first embodiment, the empty sensor 315 has a leaf portion which is deformed by the contact with the sheet 112 under tension. The deformed portion can restore its original shape when the sheet is released from the leaf portion.

Figure 14:
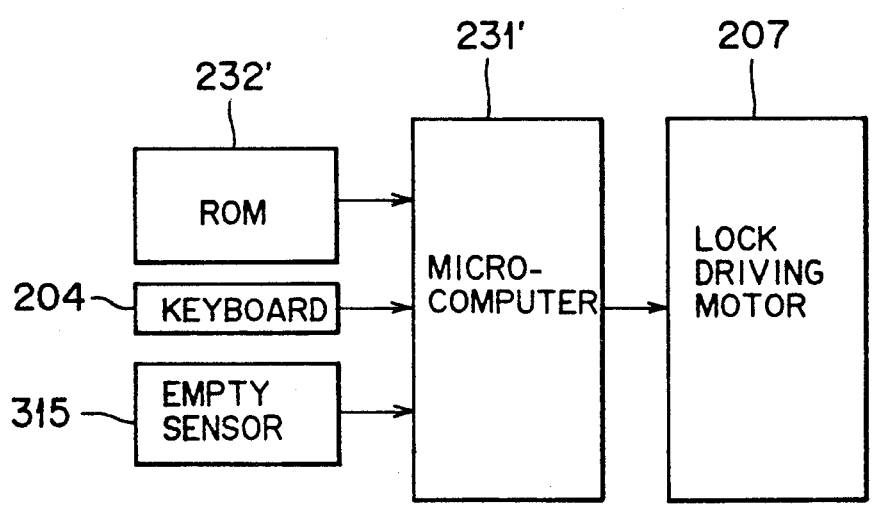
FIG. 14 is a block diagram showing a control arrangement for controlling locking to a light shielding plate according to the third embodiment of this invention.

A control arrangement for controlling locking to the light shielding plate 203 (FIGS. 9 and 10) according the third embodiment will be described with reference to FIG. 14. The key board 204 is adapted to generate light shielding plate locking signal, and a microcomputer 231' is connected to the key board. Further, the microcomputer 231' is connected to a ROM 232' in which stored are various programs. Furthermore, the microcomputer 231' is connected to the empty sensor 315. Moreover, the microcomputer 231' is connected to the lock driving motor 207 for angularly moving the locking lever 208 by a predetermined angle so as to engage with or disengage from the locking slot 209a of the locking plate 209 (FIGS. 9 and 10).

With the arrangement, if the sheet cartridge 115 is mounted on a predetermined portion of the copying machine, the microcapsule sheet 112 is automatically delivered along its sheet path and is taken up over the takeup shaft 124 by the automatic sheet loading arrangement described with reference to FIG. 8. Then, the key board 204 is manipulated so as to transmit command signal to the microcomputer 231' for locking the light shielding plate 203. In response to the signal, the microcomputer 231' sends a drive signal to the lock driving motor 207 so as to pivotally move the locking lever 208 by 90 degrees. As a result, the locking lever 208 is brought into engagement with the locking plate 209 for preventing the light shielding plate 203 from its free opening motion.

If a tail edge of the microcapsule sheet passes through the empty sensor 315, the sensor 315 generates an unlock signal to the microcomputer 231'. In response to the unlock signal, the microcomputer operates the lock driving motor 207 in such a manner that the motor is rotated in a opposite direction by 90 degrees. Consequently, the locking lever 208 becomes disengaged from the locking plate 209 for allowing the light shielding plate 203 to be freely opened.

In the third embodiment, the light shielding plate 203 is locked by the manipulation of the key board 203. Therefore, inadvertent light exposure to the microcapsule sheet 112 due to inadvertent opening of the light shielding plate is avoidable. Further, similar to the first embodiment, the light shielding plate automatically has its unlocking state in response to the signal from the empty sensor. Therefore, upon complete use of the microcapsule sheet, the operator can remove the sheet cartridge without any additional manipulation.

Next, will be described means for preventing the sheet cartridge from being freely disassembled from the machine frame or chassis according to a fourth embodiment. The fourth embodiment is also particularly available to the image recording apparatus or copying machine shown in FIGS. 7 and 8. The fourth embodiment provides the sheet cartridge, the sheet cartridge mounting portion, and cartridge locking mechanism the same as those of the second and the third embodiments shown in FIGS. 9, 10 and 13.

Figure 15:
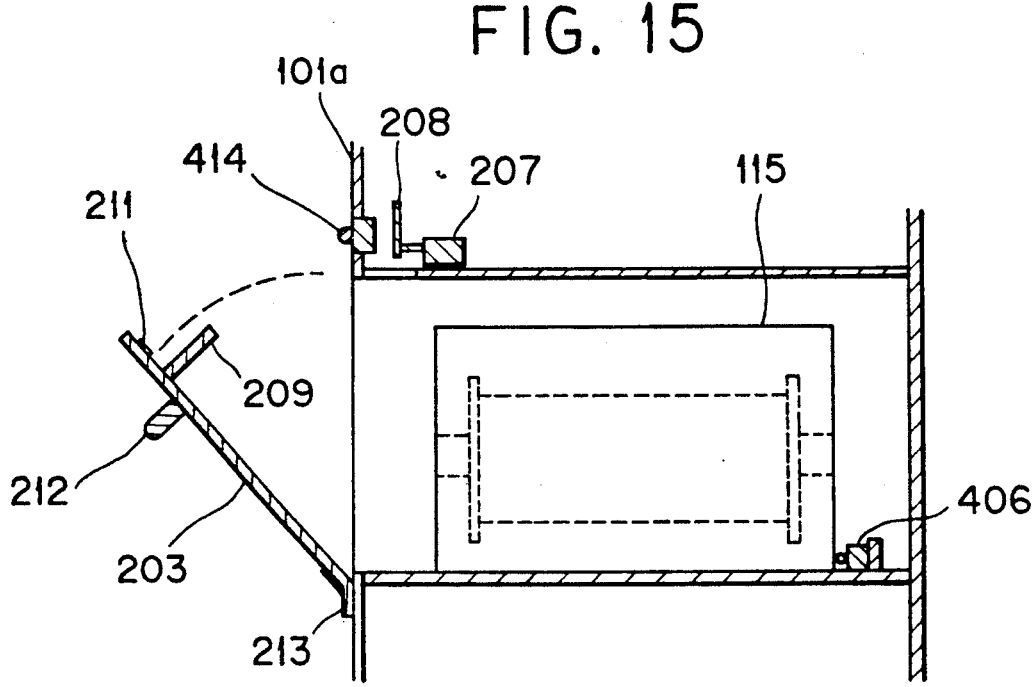
FIG. 15 is a cross-sectional view showing a sheet cartridge and a cartridge mounting portion according to a fifth embodiment of this invention.

However, in the fourth embodiment, as best shown in FIG. 15, the chassis 101a is provided with a plate sensor 414 at a position abuttable on the light shielding plate 203 when the latter is seated on the chassis 101a. That is, the plate sensor 414 generates High level signal when closing the light shielding plate 203. Further, a cartridge sensor 406 corresponding to the sensor 21 in the first embodiment is provided at an internal space of the chassis. The sensor 406 will generate High level signal when the cartridge 115 is assembled into the chassis 105. Mechanical switches may be available for the plate sensor 414 and the cartridge sensor 406.

Figure 16:
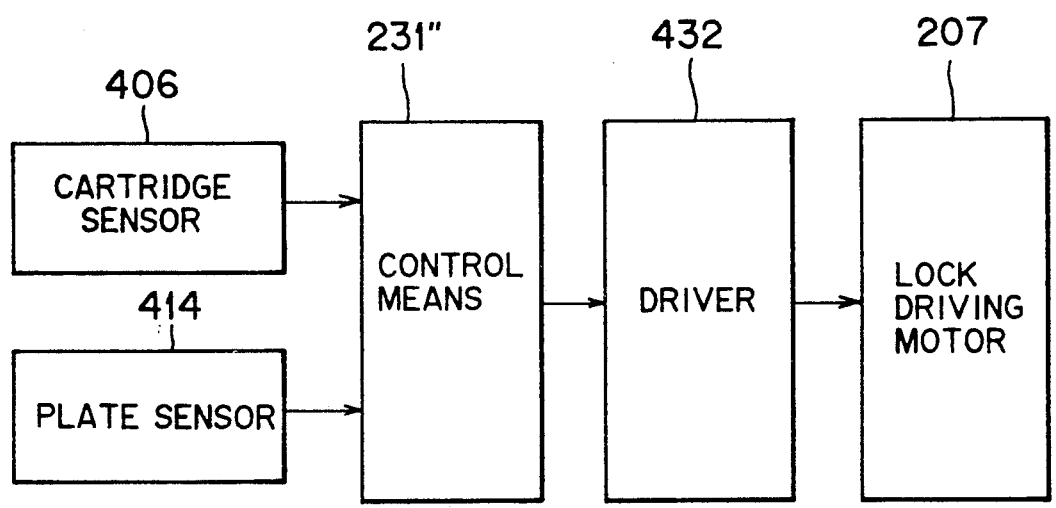
FIG. 16 is a block diagram showing a control arrangement for controlling locking to a light shielding plate according to the fourth embodiment of this invention.

A control arrangement for a control of locking to the light shielding plate 203 according to the fourth embodiment will be described with reference to FIG. 16. A control means such as a microcomputer 231" is provided. The control means 231" is connected to the cartridge sensor 406 and the plate sensor 414. Further, the control means 231" is connected to the lock driving motor 207 through a driver 432. The driver 432 is adapted to rotate the lock driving motor 207 by a predetermined angular amount in response to a signal from the control means 231". The control means will transmit a drive signal to the driver 432 of the lock driving motor when the signals from the sensor 414 and from the sensor 406 are both at High levels.

In a control routine according to the fourth embodiment, when the sheet cartridge 115 is assembled into the chassis 101a, the cartridge sensor 406 detects the cartridge 115 and generates the High level signal. This signal is transmitted to the control means 231". Further, if the light shielding plate 203 is closed, the plate sensor 414 detects the plate and High level signal is generated. This signal is also transmitted to the control means 231". As a result, the control means generates the drive signal in response to the two High level signals, and the drive signal is supplied to the driver 432. Consequently, the lock driving motor 207 is rotated by a predetermined angular amount such as by 90 degrees for pivotally moving the locking lever 208 into engagement with the locking plate 209. Thus, the light shielding plate 203 is locked at its close position. If the cartridge replacement is done while the power source is shut off, the High level signals from the plate sensor 414 and the cartridge sensor 406 are transmitted to the control means 231" when a power switch is depressed. As a result the sheet cartridge can be locked automatically in response to the power supply.

In the fourth embodiment, in case of the release of the locking state of the light shielding plate 203, the third embodiment can be applied. That is, the above described empty sensor 315 (FIG. 13) can be used. Alternatively, the key board can be provided with a specific key arrangement so as to manually input a figure code or a recital numbers. The latter arrangement will next be described with reference to FIG. 17 as a fifth embodiment.

Figure 17:
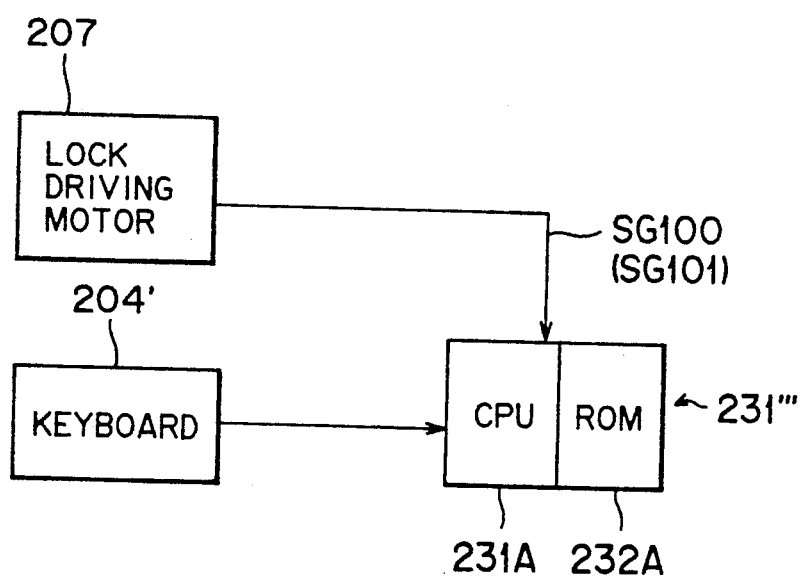
FIG. 17 is a block diagram showing a control arrangement for controlling locking to a light shielding plate according to a fifth embodiment of this invention.

In the fifth embodiment, the arrangement shown in FIGS. 7 through 10 is available. Further, as shown in FIG. 17, a control means 231''' having a CPU 231A and a ROM 232A is provided in the control arrangement. The key board 204' and the lock driving motor 207 are connected to the CPU 231A. On the key board 204', the figure code is to be inputted by an operator. The ROM 232A stores therein a preset figure code, and the CPU 231A is adapted to compare the stored figure code with the actually inputted figure code manipulated on the keyboard 204'. The lock driving motor 207 is adapted be rotatable by a predetermined rotation angle in response to a signal SG100 from the CPU 231A if the manipulated figure code is coincident with the stored figure code.

With the arrangement, if the sheet cartridge 115 is to be exchanged with a new cartridge, an operator manipulates the key board 204' for inputting the figure code. Then, manipulated figure code signal is sent to the control means 31''' in which comparison is made between the manipulated figure code signal the stored figure code. If these codes are coincident with each other, the determination falls YES, so that the output signal SG100 is transmitted from the control means 231''' to the lock driving motor 207 so as to rotate its drive shaft by 90 degrees. Accordingly, the locking lever 208 is disengaged from the locking plate 209 to permit the light shielding plate 203 to be freely opened.

In the fifth embodiment, in order to obtain locking to the light shielding plate 203, the fourth embodiment may be available. Alternatively, another figure code can be used for locking the light shielding plate. That is, the other figure code is manipulated on the key board 204', and the control means 231''' is adapted to generate another signal SG101 for driving the lock driving motor 207 so as to provide a locking engagement between the locking lever 208 and the locking plate 209. In this case, the ROM 232A stores therein another figure code for the comparison with the inputted manipulated figure code.

While the invention has been described in detail and with reference to specific embodiment thereof, it would be apparent to those skilled in the art that various changes and modifications can be made therein without departing from the spirit and scope of the invention. In other words, technical concepts in one of the embodiments can be applied to the remaining one of the embodiments for automatically locking and/or unlocking the sheet cartridge or the light shielding plate.

What is claimed is:

1. An image recording apparatus which uses an elongated photosensitive recording medium, the apparatus including a frame and a sheet cartridge detachably provided at a predetermined position of the frame, the sheet cartridge storing therein the elongated photosensitive recording medium, and the improvement comprising;

locking means for preventing the sheet cartridge from being disassembled from the predetermined position;

means for generating a first signal indicative of providing the locking means at its locking position;

means for generating a second signal indicative of providing the locking means at its unlocking position; and control means connected to the locking means for driving the locking means to one of its locking and unlocking positions in response to one of the first and second signals.

2. The image recording apparatus as claimed in claim 1, wherein the means for generating the first signal comprises a first detecting means for detecting assembly of the sheet cartridge onto the predetermined position of the frame, the first detecting means generating the first signal indicative of the assembly of the sheet cartridge; and wherein the means for generating the second signal comprises a second detecting means for detecting existence of the photosensitive recording medium within the sheet cartridge, the second detecting means generating the second signal indicative of a complete discharge of the photosensitive recording medium from the sheet cartridge.

3. The image recording apparatus as claimed in claim 2, wherein the sheet cartridge is provided with a cartridge shaft around which the photosensitive recording medium is wound, and wherein the locking means is selectively engageable with the cartridge shaft.

4. The image recording apparatus as claimed in claim 3, wherein the frame comprises a pair of chassis confronting with each other to define an internal space therebetween, and a cartridge seat fixedly connected to the chassis and on which the sheet cartridge is mounted, and wherein the first detection means is connected to the cartridge seat so as to detect a mounting state of the sheet cartridge on the cartridge seat.

5. The image recording apparatus as claimed in claim 2, further comprising a pull out roller positioned at immediately downstream of the sheet cartridge, and a tension roller positioned downstream of the pull out roller, the second detection means being positioned between the pull out roller and the tension roller.

6. The image recording apparatus as claimed in claim 5, wherein the second detection means comprises means for detecting a tension of the photosensitive recording medium positioned between the pull out roller and the tension roller.

7. The image recording apparatus as claimed in claim 2, wherein the frame provides an internal cartridge installation space defining an open end, and the image recording apparatus further comprising a light shielding means positioned for closing the opened end, and wherein the locking means is selectively engageable with the light shielding means.

8. The image recording apparatus as claimed in claim 7, wherein the installation space defines a deep end portion, and wherein the first detection means is positioned at the deep end portion for detecting complete insertion of the sheet cartridge into the installation space.

9. The image recording apparatus as claimed in claim 8, further comprising a third detection means for detecting a closing state of the light shielding means, the third detection means generating a third detection signal indicative of the closure of the light shielding means, the control means permitting the locking means to have its locked state in response to the first and the third signals.

10. The image recording apparatus as claimed in claim 7, wherein the sheet cartridge is provided with a discharge portion which allows the photosensitive recording medium to pass therethrough, and wherein the second detection means is positioned at the discharge portion, the second detection means comprising means for detecting a tension of the photosensitive image recording medium.

11. The image recording apparatus as claimed in claim 10 further comprising a third detection means for detecting a closing state of the light shielding means, the third detection means generating a third detection signal indicative of the closure of the light shielding means, the control means permitting the locking means to have its locked state in response to the first and the third signals.

12. The image recording apparatus as claimed in claim 1, further comprising a key board for various operation of the image recording apparatus, and wherein the means for generating the second signal comprises the key board on which a code is manipulated.

13. The image recording apparatus as claimed in claim 12, wherein the control means comprises a judging means for judging whether the manipulated code on the key board is identical with a stored code indicative of providing the unlocking state of the locking means.

14. The image recording apparatus as claimed in claim 13, wherein the means for generating the first signal comprises the key board on which another code is manipulated, the judging means judging whether the manipulated another code is identical with a stored another code indicative of providing the locking state of the locking mechanism.

15. An image recording apparatus which uses an elongated photosensitive recording medium, the apparatus including a frame and a sheet cartridge detachably provided at a predetermined position of the frame, the sheet cartridge storing therein the elongated photosensitive recording medium, and the improvement comprising;
    the frame being provided with a sheet cartridge installing portion defining an open end;
    a light shielding means for selectively closing the open end in order to avoid inadvertent light irradiation onto the photosensitive recording medium;
    locking means for locking the light shielding means at its close position;
    detecting means for detecting the photosensitive recording medium within the sheet cartridge, the detecting means generating a signal indicative of a complete discharge of the photosensitive recording medium out of the sheet cartridge; and
    control means connected to the locking means for releasing the locking state of the light shielding means in response to the signal.

16. The image recording apparatus as claimed in claim 15 wherein the detection means comprises means for detecting a tension of the photosensitive image recording medium.

17. The image recording apparatus as claimed in claim 16 wherein the sheet cartridge is provided with a discharge portion which allows the photosensitive recording medium to pass therethrough, and wherein the detecting means is positioned at the discharge portion.

18. An image recording apparatus which uses an elongated photosensitive recording medium, the apparatus including a frame, a takeup means, and a sheet cartridge detachably provided at a predetermined position of the frame, the sheet cartridge having a cartridge shaft and storing therein the elongated photosensitive recording medium, the medium being pulled out of the sheet cartridge and taken up by the takeup means through a sheet path; and the improvement comprising;
    first detecting means for detecting assembly of the sheet cartridge onto the predetermined position of the frame, the first detecting means generating a first signal indicative of the assembly of the sheet cartridge;
    second detecting means for detecting existence of the photosensitive recording medium within the sheet cartridge, the second detecting means generating a second signal indicative of a complete discharge of the photosensitive recording medium from the sheet cartridge;
    means for preventing the sheet cartridge from being disassembled from the predetermined position; and
    control means for executing the prevention of the disassembly in response to at least the first signal and for cancelling the prevention of the disassemby of the sheet cartridge in response to the second signal.

19. The image recording apparatus as claimed in claim 18, wherein the means for preventing comprises a locking mechanism for locking the cartridge shaft with respect to the frame, the locking mechanism being connected to the control means.

20. The image recording apparatus as claimed in claim 19, wherein the frame comprises a pair of chassis confronting with each other to define an internal space therebetween, and a cartridge seat fixedly connected to the chassis and on which the sheet cartridge is mounted, and wherein the first detection means is connected to the cartridge seat so as to detect a mounting state of the sheet cartridge on the cartridge seat.

21. The image recording apparatus as claimed in claim 20 wherein the second detection means comprises means for detecting a tension of the photosensitive image recording medium fed along the sheet path, the tesion detecting means being positioned adjacent the sheet path.

22. The image recording apparatus as claimed in claim 21, further comprising a pull out roller positioned at immediately downstream of the sheet cartridge with respect to the sheet path, and a tension roller positioned downstream of the pull out roller, the tension detecting means being positioned between the pull out roller and the tension roller.

23. The image recording apparatus as claimed in claim 18, wherein the frame provides an internal cartridge installation space defining an open end, and the image recording apparatus further comprising a light shielding means positioned for closing the opened end, and wherein the means for preventing comprises a locking mechanism for locking the light shielding means with respect to the frame, the locking mechanism being connected to the control means.

24. The image recording apparatus as claimed in claim 23, wherein the installation space defines a deep end portion, and wherein the first detection means is positioned at the deep end portion for detecting complete insertion of the sheet cartridge into the installation space.

25. The image recording apparatus as claimed in claim 24, further comprising a third detection means for detecting a closing state of the light shielding means, the third detection means generating a third detection signal indicative of the closure of the light shielding means, the control means permitting the locking mechanism to have its locked state in response to the first and the third signals.

26. The image recording apparatus as claimed in claim 23, wherein the second detection means comprises means for detecting a tension of the photosensitive image recording medium.

27. The image recording apparatus as claimed in claim 26, wherein the sheet cartridge is provided with a discharge portion which allows the photosensitive recording medium to pass therethrough toward the takeup means, and wherein the tension detecting means is positioned at the discharge portion.

28. The image recording apparatus as claimed in claim 27, further comprising a third detection means for detecting a closing state of the light shielding means, the third detection means generating a third detection signal indicative of the closure of the light shielding means, the control means permitting the locking mechanism to have its locked state in response to the first and the third signals.

29. The image recording apparatus as claimed in claim 18, wherein the sheet cartridge has an upper cartridge wall, and wherein the means for preventing comprises a locking mechanism for locking the upper cartridge wall with respect to the frame, the locking mechanism being connected to the control means.

30. The image recording apparatus as claimed in claim 29, wherein the frame comprises a pair of chassis confronting with each other to define an internal space therebetween, and a cartridge seat fixedly connected to the chassis and on which the sheet cartridge is mounted, and wherein the first detection means is connected to the cartridge seat so as to detect a mounting state of the sheet cartridge on the cartridge seat.

31. An image recording apparatus which uses an elongated photosensitive recording medium, the apparatus including a frame and a sheet cartridge detachably provided at a predetermined position of the frame and a takeup means, the sheet cartridge storing therein the elongated photosensitive recording medium, the medium being fed along its sheet path between the sheet cartridge and the takeup means, and the improvement comprising;
an automatic sheet loading means for directing a leading end portion of the elongated photosensitive recording medium toward the takeup means along the sheet path;
locking means for preventing the sheet cartridge from being disassembled from the predetermined position;
means for detecting completion of the automatic sheet loading and for generating a signal indicative of the completion of the sheet loading;
control means for driving the locking means to its locking position in response to the sheet loading completion signal.

32. The image recording apparatus as claimed in claim 31, wherein the automatic sheet loading means comprises an automatic sheet loading start key, and wherein the detecting means comprises a counter actuatable upon manipulation of the automatic sheet loading start key, the counter counting a predetermined period during which the automatic sheet loading operation can be completed.

33. The image recording apparatus as claimed in claim 32, wherein the frame provides an internal cartridge installation space defining an open end, and the image recording apparatus further comprising a light shielding means positioned for closing the opened end, and wherein the locking means is selectively engageable with the light shielding means.

* * * * *